US012516806B2

(12) United States Patent
Rasmussen

(10) Patent No.: US 12,516,806 B2
(45) Date of Patent: Jan. 6, 2026

(54) LIGHT FIXTURE

(71) Applicant: Harman Professional Denmark ApS, Aarhus (DK)

(72) Inventor: Niels Joergen Rasmussen, Egaa (DK)

(73) Assignee: Harman Professional Denmark ApS, Aarhus (DK)

( * ) Notice: Subject to any disclaimer, the term of this patent is extended or adjusted under 35 U.S.C. 154(b) by 0 days.

(21) Appl. No.: 18/988,240

(22) Filed: Dec. 19, 2024

(65) Prior Publication Data

US 2025/0116397 A1 Apr. 10, 2025

Related U.S. Application Data

(63) Continuation of application No. PCT/EP2022/076062, filed on Sep. 20, 2022.

(30) Foreign Application Priority Data

Sep. 20, 2022 (WO) .................. PCT/EP2022/076062

(51) Int. Cl.
| | |
|---|---|
| *F21V 29/60* | (2015.01) |
| *F21V 21/30* | (2006.01) |
| *F21V 29/65* | (2015.01) |
| *F21V 29/67* | (2015.01) |
| *F21V 31/00* | (2006.01) |

(Continued)

(52) U.S. Cl.
CPC ............. *F21V 29/60* (2015.01); *F21V 21/30* (2013.01); *F21V 29/65* (2015.01); *F21V 29/67* (2015.01); *F21V 31/00* (2013.01); *F21W 2131/406* (2013.01); *F21Y 2115/10* (2016.08)

(58) Field of Classification Search
CPC .......... F21V 29/67; F21V 29/65; F21V 21/30; F21W 2131/406
See application file for complete search history.

(56) References Cited

U.S. PATENT DOCUMENTS

| | | | | |
|---|---|---|---|---|
| 6,227,686 B1 * | 5/2001 | Takahashi | .......... | G03B 21/2026 |
| | | | | 362/345 |
| 2017/0248303 A1 * | 8/2017 | Hardgrave | .......... | F21V 33/0096 |

(Continued)

FOREIGN PATENT DOCUMENTS

| | | |
|---|---|---|
| CN | 205938754 U | 2/2017 |
| EP | 0253080 A2 | 1/1988 |

(Continued)

OTHER PUBLICATIONS

Machine translation of Matsubara, WO 2019/012704, published Jan. 17, 2019 (Year: 2019).*

*Primary Examiner* — William N Harris
(74) *Attorney, Agent, or Firm* — Angela M. Brunetti

(57) ABSTRACT

The present disclosure provides a light fixture which comprises a first element forming a first compartment housing at least one light source, and a second element suspending the first element, where the second element forms a second compartment. The first and second elements are rotationally attached to each other allowing rotation of the first element relative to the second element. A closed space extends through the first compartment and the second compartment. A fan is arranged in the closed space to move air between the first and second compartments.

12 Claims, 5 Drawing Sheets

(51) Int. Cl.
*F21W 131/406* (2006.01)
*F21Y 115/10* (2016.01)

(56) References Cited

U.S. PATENT DOCUMENTS

2019/0113218 A1* 4/2019 Wiegel .................... F21V 23/04
2024/0011607 A1* 1/2024 Omae ..................... F21V 29/83

FOREIGN PATENT DOCUMENTS

EP         3816508  A1     5/2021
WO    WO-2019012704 A1 *  1/2019   ............ F21V 29/503

* cited by examiner

LIGHT FIXTURE

CROSS-REFERENCE TO RELATED APPLICATION

This application is a continuation of International Application No. PCT/EP22/076062, filed on Sep. 20, 2022, the disclosure of which is incorporated by reference herein.

FIELD OF THE DISCLOSURE

The present disclosure relates to a light fixture comprising a first element forming a first compartment and a second element forming a second compartment, where a common closed space extends through the first and second compartment. The disclosure in particular relates to ventilation of the common space.

BACKGROUND

In entertainment and architectural lighting, light fixtures, such as moving head light fixtures, are often used outdoor with the risk of rain showers. Therefore, the product should either be placed safely under a roof, or it should be ingress protected with IP (ingress protection) class 44 or higher. Furthermore, ventilation is avoided to decrease the risk of moisture and dust ingress into the light fixture, where moisture and dust may cause damage to light sources, and other elements inside the light fixture.

It is an object of embodiments of the disclosure to provide an improved light fixture.

SUMMARY

The disclosure provides a light fixture comprising:
- a first element forming a first compartment housing at least one light source, and
- a second element suspending the first element, the second element forming a second compartment,
- the first and second elements being rotationally attached to each other allowing rotation of the first element relative to the second element,
- wherein a closed space extends through the first compartment and the second compartment, and
- wherein a fan is arranged in the closed space to move air between the first and second compartments.

The light fixture may as an example be a moving head light fixtures which typically comprises a head comprising a plurality of light sources arranged for creating a light beam and a plurality of light effect elements with which various light effects can be generated. Typically, the head is rotatably connected to a yoke and the yoke is rotatably connected to a base. Typically, a moving head light fixture allows an angular position of the yoke relative to the base between 0 and 540°, meaning that the yoke can be rotated 1½ revolutions relative to the base. Similarly, the head may be moved relative to the yoke in a theoretical angle of 0 to 270°. However, the exact numbers depend on the kind of light fixture use and the allowed angles might be larger or smaller than the angles indicated above.

It should, however, be understood that that light fixture may alternatively be another kind of light fixture comprising at least one light source.

In an embodiment, in which the light fixture is a moving head light fixture, the first element may be a head being movable attached to a yoke. Thus, the second element may be a yoke.

The first element forms a first compartment which houses at least one light source. The first element may further comprise e.g., a framing system for shaping the light beam (s), a motor, and an external fan arranged for cooling the first compartment. The external fan may cool the first compartment by passing surrounding air along a part of the first element without blowing surrounding air into the first compartment.

The second element which suspends the first element forms a second compartment.

The first and second elements are rotationally attached to each other to thereby allow rotation of the first element relative to the second element.

A closed space extends through the first compartment and the second compartment. The closed space may in one embodiment be a part of the first and second compartment. In an alternative embodiment, the closed space is formed by the first and second compartments. Thus, the outer boundary of the closed space may be the outer walls of the first and second compartments. Consequently, the at least one light source may be arranged in the closed space. This may likewise be the case for other elements, such as a framing system and a motor.

A fan is arranged in the closed space to move air between the first and second compartments. As the at least one light source generating heat when turned on is arranged in the first compartment, the temperature may be higher, such as considerably higher in the first compartment than in the second compartment. By arranging a fan to move air between the first and second compartment, cooling of the first compartment may be provided. The surfaces in the second compartment further increased the overall surfaces available to absorb heat thereby increasing the overall cooling capacity. As cooling may be provided by air from the closed space, the risk of moisture and dust ingress may be avoided, or at least considerably reduced.

Movement of air in the closed space may further remove condensation, if any. As the closed space may not be fully closed, i.e., as one or more smaller openings may exist in the first and/or second element, such as in a wall part and/or in a joint between the first and second compartment, ingress of humid air may not be completely avoided. Such humid air may lead to condensation. However, by movement of air between the first and second compartment, it may be possible to avoiding condensation inside the closed space, whereby it may further be possible to avoid mildew inside the closed space.

To facilitate movement of air in the closed space, the first compartment may comprise a first inlet and a first outlet, and the second compartment may comprise a second inlet and a second outlet. The first inlet may be arranged in fluid communication with the second outlet, and the second inlet may be arranged in fluid communication with the first outlet to thereby form the closed space.

To allow rotational movement of the first element relative to the second element, the first element may be suspended at a first bearing and a second bearing arranged at the second element. The first element may rotate around a rotation axis extending through the first and second bearing. In one embodiment, the first and second inlets and the first and second outlets may be arranged in the first and second bearings. By arranging the inlets and the outlets in the first and second bearings, it may be possible to move air in the closed space and between the first and second compartments during rotation of the first element relative to the second element.

Each of the first and second bearings may comprise an outer race and an inner race. To facilitate movement of air between the first and second compartments, the first and second inlets and the first and second outlets may be arranged in the inner race, as this may allow for unhindered movement of air during use of the light fixture, such as during movement of the first element relative to the second element.

The fan is arranged in the closed space. Thus, the fan may be arranged either in the first compartment or in the second compartment. As an example, the fan may be a radial fan or an axial fan, where the radial fan moves the air radially by changing the direction of the airflow, and the axial fan moves the air substantially without changing the direction.

In one embodiment, the fan may be arranged in the second compartment, as available space may typically be larger in the second compartment than in the first embodiment. Additionally, the fan itself may generate heat, which may further increase the advantage of arranging the fan in a part of the closed space being in the second compartment.

In one embodiment, the fan may be a radial fan. The radial fan may be connected to a duct arranged in the closed space. By providing a duct in the closed space and connecting the duct to the fan, it may be possible to at least partly control the direction of the air flow in the closed space. It should be understood that the fan in an alternative embodiment may be a radial fan which is not connected to a duct.

In one embodiment, the radial fan may be arranged in the second compartment. To efficiently move air between the first and second compartments, the duct may extend from a first end attached to the radial fan to a second end free end terminating in the first compartment. It should be understood that a radial fan in an alternative embodiment may be arranged in the first compartment.

In a further alternative embodiment, the fan may be an axial fan. The axial fan may be arranged in either the first compartment or in the second compartment. It should, however, be understood that the light fixture may alternatively comprise more than one fan, e.g., a fan in each of the first and second compartment.

In an embodiment, the second compartment may comprise two sub-compartments; i.e., be divided into two separate compartments. The two sub-compartments may be in fluid communication with each other to provide the closed space extending through the first and second compartments. The fan may be arranged in one of the two sub-compartment or in an interface between the two sub-compartments, and may be arranged to press air from one sub-compartment to the other compartment, whereby a positive pressure may arise in this sub-compartment, whereas a negative pressure may arise in the other sub-compartment where the fan may be arranged. The positive pressure and the negative pressure may be equalised by air moving from the sub-compartment with positive pressure to the first compartment. Likewise, may air move from the first compartment to the sub-compartment with a negative pressure. Consequently, air may be moved between the first and second compartment, thereby cooling the first compartment.

The fan may be configured to provide a variable air flow. In one embodiment, the light fixture may comprise a controller configured to control the air flow, e.g., automatically in dependence on the time in which the light fixture has been turned on. Alternatively, or additionally, the flow may be controlled in dependence on the number of light sources in use.

The air flow may additionally or alternatively be controllable in dependency of a temperature determined in the first compartment. As an example, the temperature may be determined by measuring the temperature in the first compartment or by estimating the temperature in the first compartment. The estimation of the temperature may be based on time, such as use time, the number of light sources turned on, a predetermined use pattern, the temperature of the surrounding (estimated or measured), etc. By the term 'use pattern' should be understood a plan for use of the at least one light source.

The fan may be configured to provide an air flow in the range of 2-20 $m^3/h$, such as 4-17 $m^3/h$, such as 6-14 $m^3/h$. As specified above, the air flow may be variable and may as an example depend on the use of the light fixture, including the use of the at least on light source. The range may depend on the size of the light fixture and/or the number of light sources.

As an example, the light fixture with at least one light source may use at least 250 W, such as at least 300 W, such as at least 320 W. The fan may be arranged to keep the temperature in the first compartment below 70 degrees Celsius. Thus, the air flow may be controlled to keep the temperature in the first compartment below 70 degrees Celsius.

The fan may be controlled by a separate controlled configured for control of the fan. In an alternative embodiment, the fan may be controlled by a controlled configured to control movement of the first element relative to the second element and/or a controller configured for control of the at least one light source and/or a framing system which may be provided for shaping of the light beam(s).

BRIEF DESCRIPTION OF THE DRAWINGS

Embodiments of the disclosure will now be further described with reference to the drawings, in which.

DETAILED DESCRIPTION OF THE DRAWINGS

Figure 1:
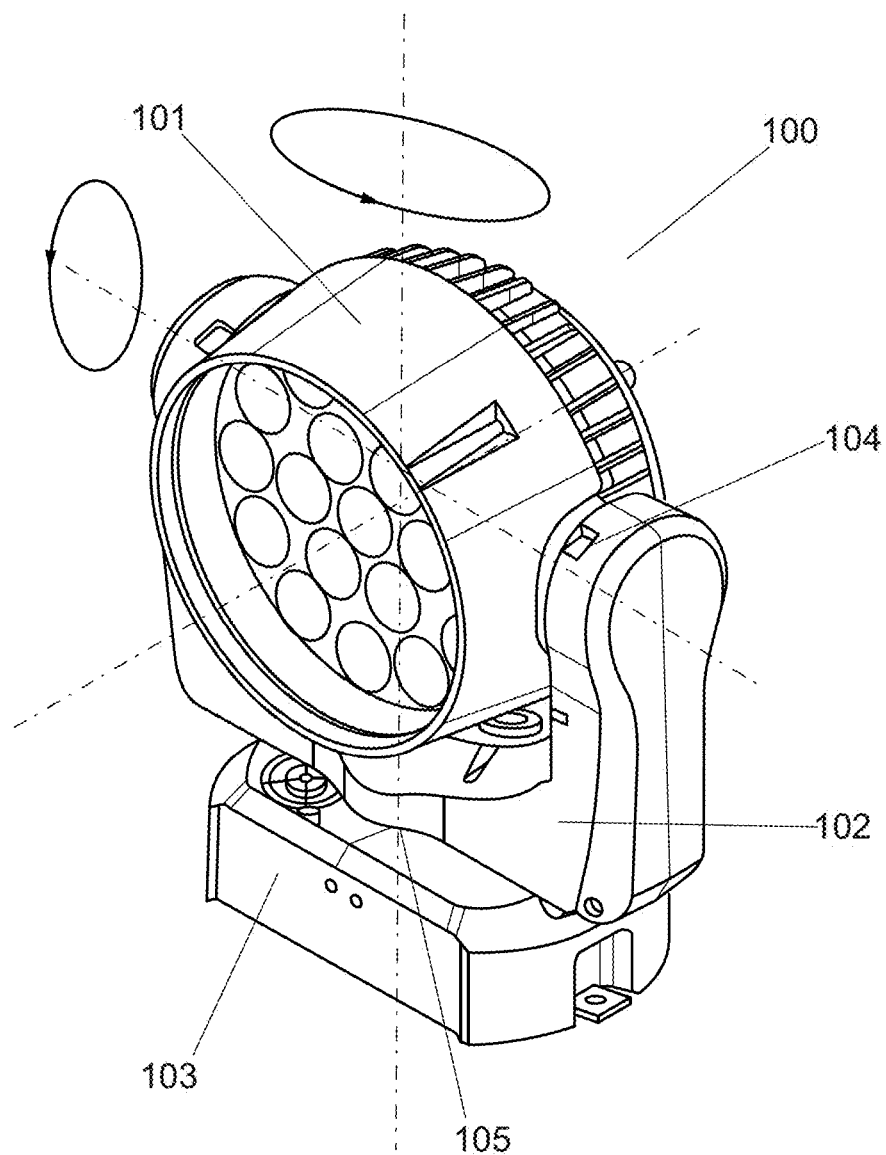
FIG. 1 illustrates an embodiment of a light fixture.

It should be understood that the detailed description and specific examples, while indicating embodiments of the disclosure, are given by way of illustration only, since various changes and modifications within the spirit and scope of the disclosure will become apparent to those skilled in the art from this detailed description.

FIGS. 1, 2, 3, 4, and 5 illustrate embodiments of a light fixture 100 in the form of a moving head light fixture. FIGS. 2-5 illustrate cross-sectional views through four different embodiments. The light fixture 100 comprises a head 101, a yoke 102, and a base 103. Two first joints 104 are arranged between the head 101 and the yoke 102, and a second joint 105 is arranged between the between base 103 and the yoke 102 to provide a head 101 being rotatably connected to a yoke 102, and a yoke 102 being rotatably connected to a base 103.

The head 101 is in the following denoted a first element 101, whereas the yoke 102 is denoted a second element 102. Two motors 170A, 170B (see FIGS. 2-5) are arranged for movement of the head 101, where the motor 170A is for rotation of the head 101, whereas the motor 170B is for tilting of the head 101.

Thus, FIG. 1 illustrates a light fixture 100 which comprises the first element 101 (the head) forming a first compartment 110 housing at least one light source 112 (see FIGS. 2-5). The light fixture 100 further comprises the second element 102 (a yoke) suspending the first element. The second element 102 forms a second compartment 120.

To allow rotational movement of the first element 101 relative to the second element 102, the first element 101 is suspended at a first bearing 122A and a second bearing 122B arranged at the second element 102. The first element 101 can thereby rotate around a rotation axis extending through the first and second bearings 122A, 122B.

The first and second compartments 110, 120 form an inner, or closed, space 130 in which a fan 125 is arranged. A third compartment 140 is formed in the base 103.

Figure 2:
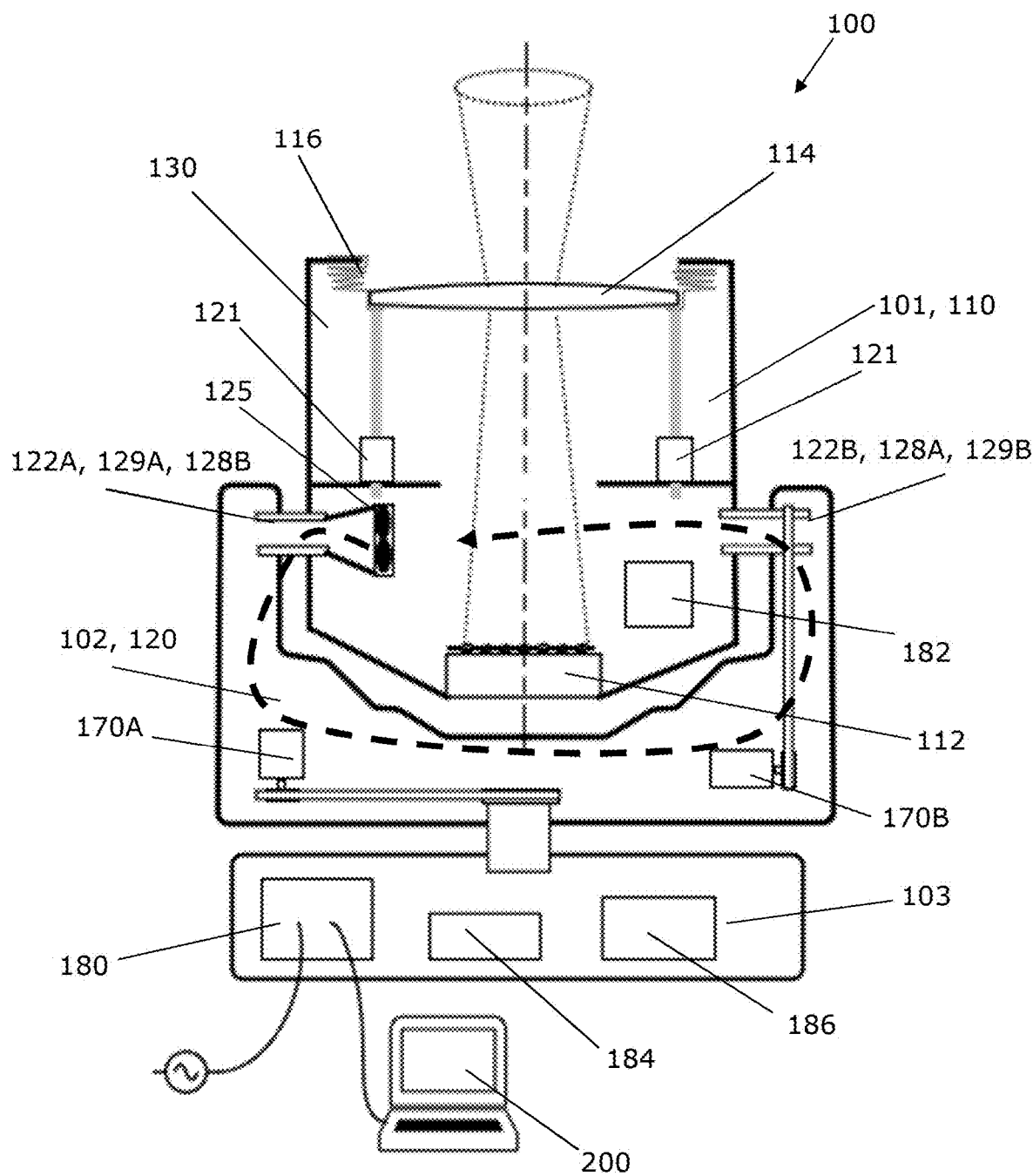
FIG. 2 illustrates a cross-section through an embodiment of a light fixture with a fan in the first compartment.
Figure 3:
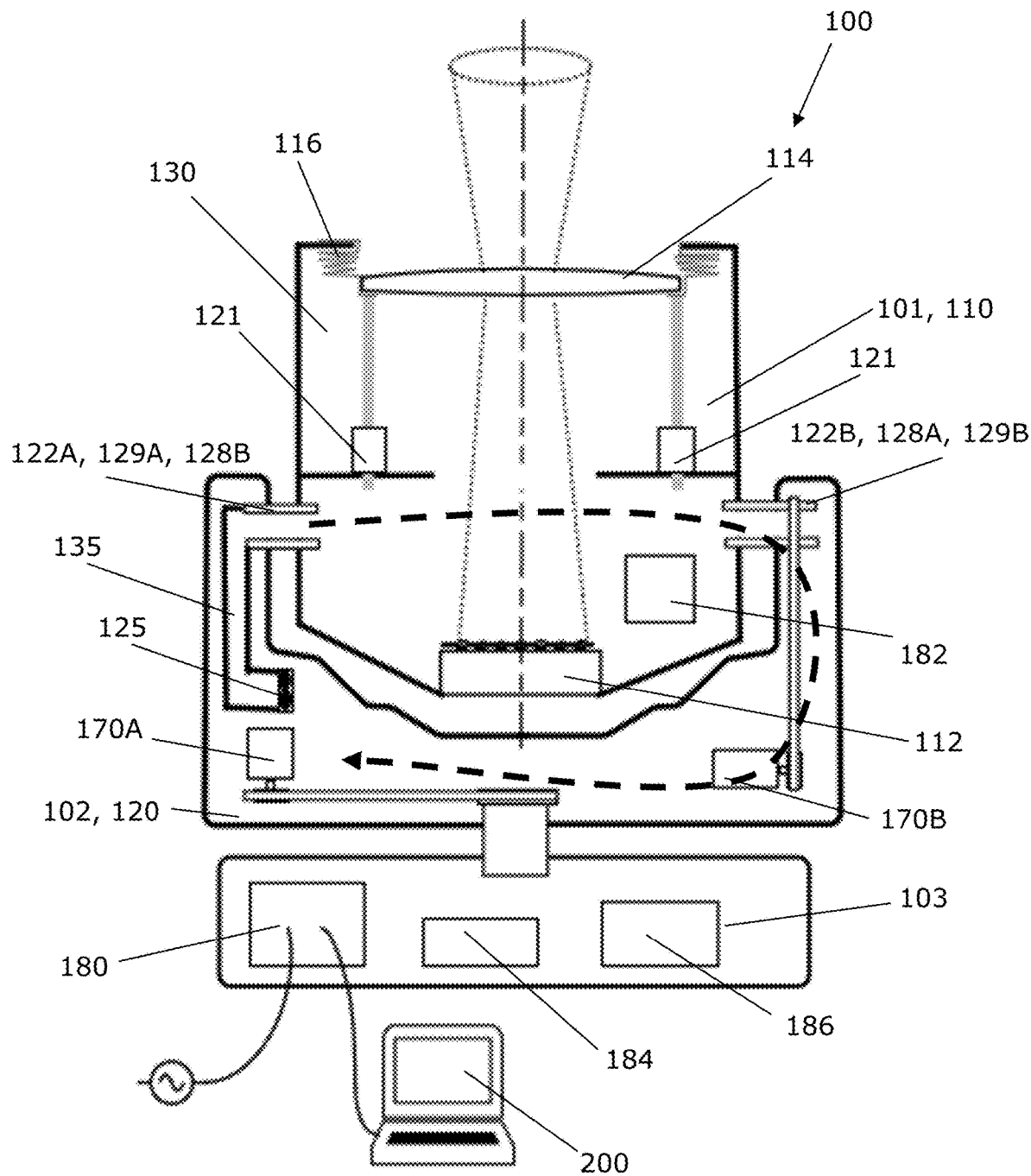
FIG. 3 illustrates a cross-section through an embodiment of a light fixture with a fan in the second compartment.
Figure 4:
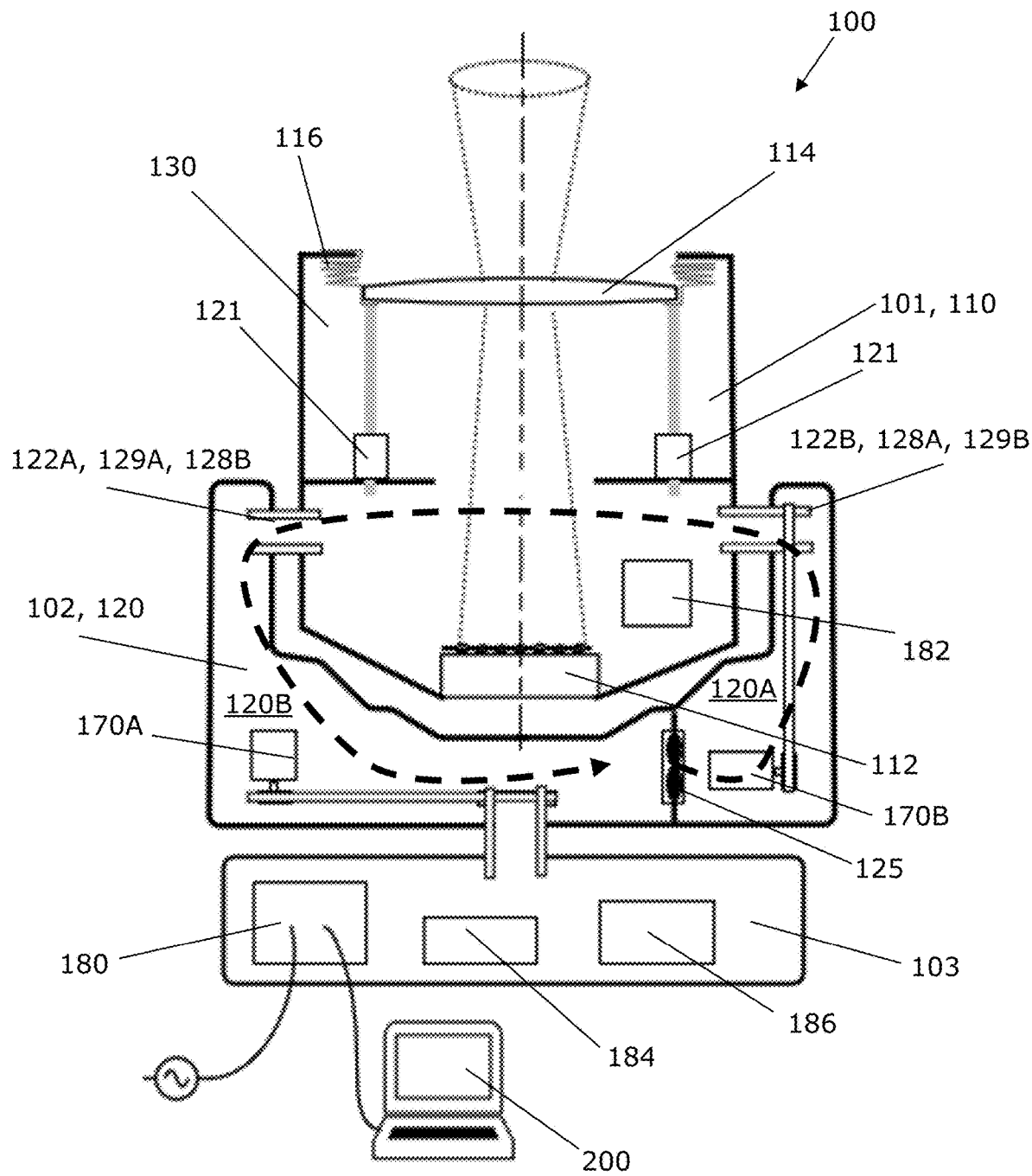
FIG. 4 illustrates a cross-section through an embodiment of a light fixture with a fan in the second compartment comprising two sub-compartments.
Figure 5:
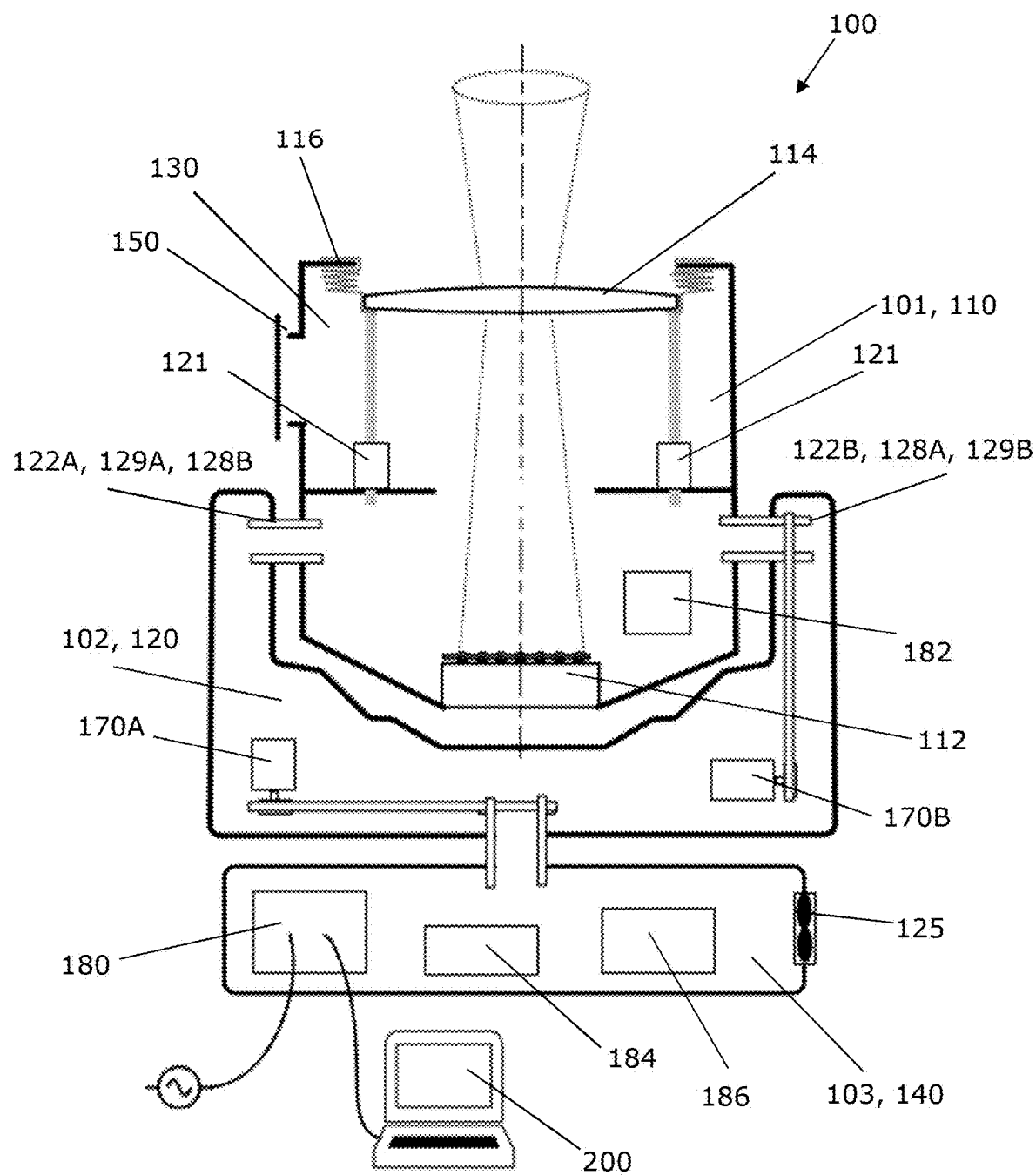
FIG. 5 illustrates a cross-section through an embodiment of a light fixture with a fan in the third compartment.

The four different embodiments of the light fixture 100 illustrated in FIGS. 2-5, respectively, are similar with the exception that the fan 125 in the embodiment illustrated in FIG. 2 is arranged in the first compartment 110, in the embodiments illustrated in FIGS. 3 and 4 is arranged in the second compartment 120, and in the embodiment illustrated in FIG. 5 is arranged in the third compartment 140.

To facilitate movement of air in the closed space 130, the first compartment 101 comprises a first inlet 128A and a first outlet 129A, and the second compartment 120 comprises a second inlet 128B and a second outlet 129B. The first inlet 128A is arranged in fluid communication with the second outlet 129B, and the second inlet 128B is arranged in fluid communication with the first outlet 129A to thereby form the closed space 130. It should be understood that the first inlet 128A and the first outlet 129A may be arranged vice versa depending on the direction of the flow. This may also be the case for the second inlet 128B and the second outlet 129B.

In the illustrated embodiment, the first and second inlets 128A, 128B and the first and second outlets 129A, 129B are arranged in the first and second bearings 122A, 122B. By arranging the inlets and the outlets in the first and second bearings, it is possible to move air in the closed space 130 and between the first and second compartments 110, 120 during rotation of the first element 101 relative to the second element 102.

In the embodiment illustrated in FIG. 2, the fan 125 is arranged in the part of the closed space 130 which is in the first compartment 110. The fan 125 is an axial fan arranged to blow air from the first compartment 110 via the first outlet 129A and the second inlet 128B to the second compartment 120. Axial fan indicates that the direction of the incoming air and the outgoing are does not change. The blades rotate around an axis and the air flow is parallel to the axis. This movement of air creates a positive pressure in the second compartment 120 and a negative pressure in the first compartment 110, whereby air is moved from the second compartment 120 to the first compartment 110 via the second outlet 129B and the first inlet 128A. The movement of air is illustrated by the dotted arrow.

In the embodiment illustrated in FIG. 3, the fan 125 is arranged in the part of the closed space 130 which is in the second compartment 120. The fan 125 is a radial fan arranged to blow air from the second compartment 120 via the second inlet 129A and the first outlet 128B to the first compartment 110. Radial means that air is pulled into the fan via a side intake and the output direction is radially from the center of the fan. A duct 135 is connected to the radial fan 125 and terminates at the first bearing 122A. The movement of air via the duct 135 creates a positive pressure in the first compartment 110 and a negative pressure in the second compartment 120, whereby air is moved from the first compartment 110 to the second compartment 120 via the first inlet 128A and the second outlet 129B. The movement of air is illustrated by the dotted arrow. Thus, in this illustration inlets and outlets are used oppositely.

In the embodiment illustrated in FIG. 4, the fan 125 is arranged in the part of the closed space 130 which is in the second compartment 120. The second compartment 120 is divided into two sub-compartments 120A, 120B, where the fan 125 is arranged in an interface between the two sub-compartments 120A, 120B. The fan 125 arranged to press air from the second sub-compartment 120B to the first sub-compartment 120A, whereby a positive pressure arises in the first sub-compartment 120A, whereas a negative pressure arises in the second sub-compartment 120B. The positive pressure and the negative pressure are equalised by moving air from the first sub-compartment 120A with positive pressure to the first compartment 110 and move air from the first compartment 110 to the second sub-compartment 120B with a negative pressure. Air is moved from the first sub-compartment 120A to the first compartment 110 via the second outlet 129B and the first inlet 128A, and air is moved from the first compartment 110 to the second sub-compartment 120B via the first outlet 129A and the second inlet 128B. The movement of air is illustrated by the dotted arrow.

In all embodiments, the fan 125 it arranged to move air between the first and second compartment 110, 120, whereby cooling of the first compartment 110 is provided. As cooling is provided by use of air from the closed space 130, the risk of moisture and dust ingress can be avoided.

In the embodiment illustrated in FIG. 5, the fan 125 is arranged in the third compartment 140. The fan 125 is an axial fan arranged to draw air from the first compartment 110 via the second compartment 120 to the third compartment 140. An opening 150 is arranged in the first compartment 110 so that surrounding air can be drawn into the first compartment 110, when the fan 125 draws air from the first compartment 110 to the third compartment 140 via the second compartment 120.

An external computer 200 is in communication with a controller 180 integrated in the base 103. The controller 180 is arranged to control a lens 114, to control the light source 112, to control a framing system (not shown) arranged to shape a light beam, to control movement the first element/ the head 101, to control movement of the second element/the yoke 102, etc. The controller 180 further controls the fan 125. Additionally, a driver board 182 is arranged in the head 101 for control of the head 101 and the light sources 112. The driver board 182 is in communication with the controller 180.

The lens 114 is movably arranged relative to the light sources 112. The lens 114 is arranged substantially perpendicular to the at least one light source 112, and movement relative to the light source 112 is a substantially linear movement in a direction away from at least one light source 112 and towards the at least one light source 112. A deformable membrane 116 defining a tubular shape is at its opposite ends attached to the lens 114 and to first element 101 to seal the first element 101 along the circumference of the lens 114. The lens 114 is moved back and forth in front of the light sources 112 by use of a plurality of motors 121, where only two motors 121 are visible. In the illustrated embodiment, the motors 121 are linear motors in the form of spindle motors.

In the illustrated embodiment, the base 103 further comprises a user input element 184. The user input element 184 may as an example comprise bottoms, touch pad(s), a keyboard, etc. Additionally, the base 103 comprises a display 186 enabling a user to interact with the user input element 184.

The invention claimed is:

1. A light fixture comprising:
    a first element forming a first compartment housing at least one light source;
    a second element suspending the first element, the second element forming a second compartment;
    the first and second elements being rotationally attached to each other allowing rotation of the first element relative to the second element;
    wherein a closed space extends through the first compartment and the second compartment, the closed space is part of the first and second compartments; and
    wherein a fan is arranged in the closed space to move air between the first and second compartments.

2. The light fixture according to claim 1, wherein the first compartment comprises a first inlet and a first outlet, and the second compartment comprises a second inlet and a second outlet, the first inlet being arranged in fluid communication with the second outlet, and the second inlet being arranged in fluid communication with the first outlet to form the closed space.

3. The light fixture according to claim 2, wherein the first element is suspended at a first bearing and a second bearing arranged at the second element allowing rotational movement of the first element around a rotation axis extending through the first and second bearing, and wherein the first and second inlets and the first and second outlets are arranged in the first and second bearings.

4. The light fixture according to claim 3, wherein each of the first and second bearings comprises an outer race and an inner race, and wherein the first and second inlets and the first and second outlets are arranged in the inner race.

5. The light fixture according to claim 1, wherein the second compartment comprises two sub-compartments being in fluid communication with each other.

6. The light fixture according to claim 1, wherein the fan is a radial fan, and wherein the radial fan is connected to a duct arranged in the closed space.

7. The light fixture according to claim 1, wherein the fan is an axial fan.

8. The light fixture according to claim 1, wherein the fan is configured to provide a variable air flow.

9. The light fixture according to claim 8, wherein the variable air flow is controllable in dependency of a temperature determined in the first compartment.

10. The light fixture according to claim 1, wherein the fan is configured to provide an air flow in a range of 2-20 $m^3/h$.

11. The light fixture according to claim 10, wherein the air flow range is 4-17 $m^3/h$.

12. The light fixture according to claim 10, wherein the air flow range is 6-14 $m^3/h$.

* * * * *